UNITED STATES PATENT OFFICE.

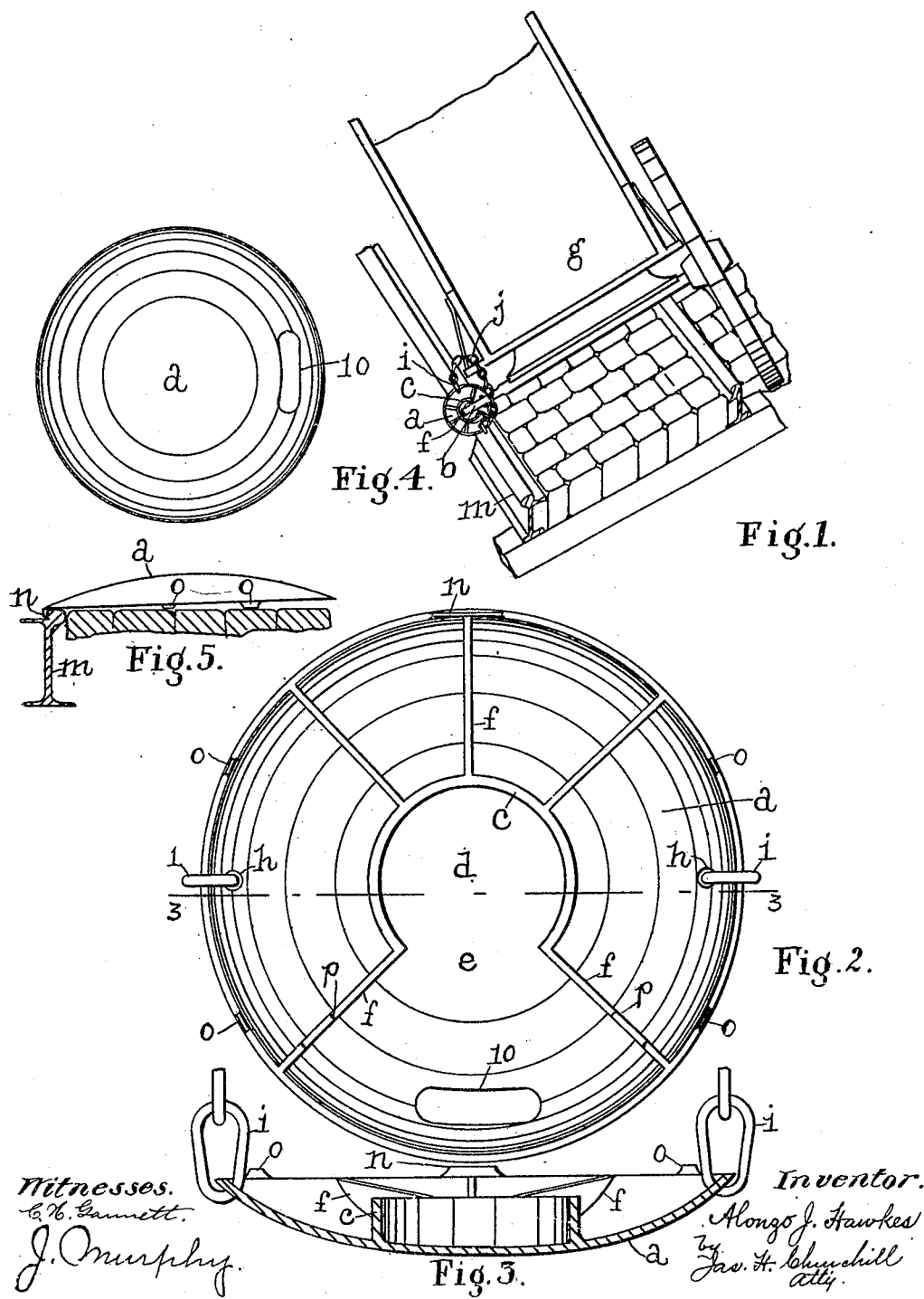

ALONZO J. HAWKES, OF CAMBRIDGE, MASSACHUSETTS.

WAGON-REMOVER.

No. 843,146.  Specification of Letters Patent.  Patented Feb. 5, 1907.

Application filed November 16, 1906. Serial No. 343,680.

*To all whom it may concern:*

Be it known that I, ALONZO J. HAWKES, a citizen of the United States, residing in Cambridge, in the county of Middlesex and State of Massachusetts, have invented an Improvement in Wagon-Removers, of which the following description, in connection with the accompanying drawings, is a specification, like letters on the drawings representing like parts.

This invention relates to a device especially adapted among other uses to be employed in removing heavy obstacles from the tracks of street-railways, and more particularly in removing wagons which may have broken down, as by a wheel coming off or being broken.

The device may also be used for replacing a car which may have become derailed.

These and other features of this invention will be pointed out in the claims at the end of this specification.

Figure 1 represents in perspective a sufficient portion of a street-railway, a wagon broken down, and the device embodying this invention to enable it to be understood. Fig. 2 is a plan view, on an enlarged scale, of the device shown in Fig. 1; Fig. 3, a section on the line 3 3, Fig. 2; Fig. 4, an inverted view of the device shown in Fig. 2, and Fig. 5 a sectional view representing the device in use as a car-replacer.

The device herein shown as embodying this invention, consists of a concaved or dish-shaped body portion $a$, of steel or other metal, having a rounded exterior surface and provided within the concavity of the same with an abutment for the end of the axle $b$ or it may be the hub of a wheel whose spokes have collapsed or become broken.

The abutment may be made in the form of an annular wall $c$, erected upon the body portion $a$, and of suitable length to form a chamber $b$, located substantially at the center of said body portion. The wall $c$ in the present instance is shown as extending beyond a semicircle and leaves an opening or mouth $e$ (see Fig. 2) for the entrance of the axle $b$. While I may prefer to make the wall of the chamber $d$ continuous, as represented, I do not desire to limit my invention in this respect, as said wall may be made in sections or it may be formed by a series of lugs or pins erected upon the body portion and arranged in a substantially circular formation. The abutment $c$ may be connected with the body portion by a series of substantially radial ribs $f$, which serve to reinforce the abutment against the end thrust and also serve to reinforce the body portion against a crushing strain or force.

Provision is made for attaching the device to the wagon or other vehicle $g$, and for this purpose the body portion $a$ is provided with substantially diametrically opposite holes $h$, through which are passed links or rings $i$, to which a chain $j$ or other flexible connection may be attached, by means of which the device may be connected with the wagon or other vehicle after the manner represented in Fig. 1, and when so connected the wagon or other vehicle can be easily drawn or removed from the car-tracks, as the rounded outer surface of the body portion $a$ of the device offers a minimum resistance to the movement of the vehicle.

In operation with the device herein shown the lowered end of the wagon is jacked up or lifted sufficiently to enable the device to be slipped under the end of the axle until the latter bears against the abutment $c$, after which the device is made fast to the wagon by the chain or other flexible connection $j$, and the wagon can then be drawn, pushed, or otherwise moved off of the track.

The removing device may also be used fo replacing a car which may be derailed by inverting the said device after the manner represented in Figs. 4 and 5, for by reason of the crown shape or concaved form of the inverted body portion the car-wheel may be run across the same and be directed down onto the rail $m$, with which the edge of the body portion $a$ registers.

I may prefer to provide the body portion on its under side and at the edge of the same with a lip $n$, which is adapted to engage the rail and hold the device against movement away from said rail and also to provide additional lugs $o$ on the edge of the body portion and lugs $p$ on the ribs $f$ remote from the lip $n$.

The lugs $p$ may be longer or deeper than the lugs $o$, so as to elevate the rear portion of the device, and thus incline the front portion thereof down toward the rail, thereby facilitating the replacement of the derailed car.

I may prefer to provide the device with the lugs $o$ $p$; but they may be omitted and the rear portion thereof elevated by a stick or other devices inserted beneath the same. So, also, I may provide the body portion $a$ with an elongated opening 10 within the circumference of the same and forming a handhold by which the device may be easily carried and also placed in operative position.

I claim—

1. A device of the character described, comprising a concaved body portion having an abutment within the concavity of the same, ribs connecting said abutment with said body portion, and lugs attached to said body portion and said ribs, substantially as described.

2. A device of the character described, comprising a concaved body portion provided with a rounded exterior surface capable of tilting on the ground and having an abutment within the concavity of the same forming a chamber, for the purpose specified.

3. A device of the character described, comprising a concaved body portion having a rounded exterior surface capable of tilting on the ground, and means attached to said body portion within the concavity to form an abutment, for the purpose specified.

4. A device of the character described, comprising a concaved body portion, and a substantially semicircular wall attached to the body portion within the concavity of the same, substantially as described.

In testimony whereof I have signed my name to this specification in the presence of two subscribing witnesses.

A. J. HAWKES.

Witnesses:
    JAS. H. CHURCHILL,
    J. MURPHY.